United States Patent [19]

Pedersen

[11] Patent Number: 4,878,541
[45] Date of Patent: Nov. 7, 1989

[54] HORSESHOE, ESPECIALLY FOR TROTTING HORSES

[76] Inventor: Palle Pedersen, Nymarksgade 31, DK-5474 Veflinge, Denmark

[21] Appl. No.: 174,795
[22] PCT Filed: Jul. 27, 1987
[86] PCT No.: PCT/DK87/00095
   § 371 Date: Mar. 30, 1988
   § 102(e) Date: Mar. 30, 1988
[87] PCT Pub. No.: WO88/00793
   PCT Pub. Date: Feb. 11, 1988

[30] Foreign Application Priority Data
   Jul. 30, 1986 [DK] Denmark ............... 3610/86

[51] Int. Cl.4 ............................. A01L 5/00
[52] U.S. Cl. ........................ 168/4; 168/14; 168/28
[58] Field of Search ........... 168/4, 14, 26, 28, DIG. 1

[56] References Cited
   U.S. PATENT DOCUMENTS
   503,848  8/1893  Hallanan ................. 168/14
   684,935 10/1901  Hirsch ................... 168/14
   710,999 10/1902  Powers .................. 168/28
   903,043 11/1908  Barber .................. 168/28
   2,191,834 2/1940 Slack ................... 168/28

Primary Examiner—Robert P. Swiatek
Attorney, Agent, or Firm—Antonelli, Terry & Wands

[57] ABSTRACT

A horseshoe for hooves of four legs of a trotting horse includes a thin plate member of a resiliently bendable plastic having two thickened areas, namely, an outer arched area along a front half of the shoe and a rear triangular area, with the two areas being connected through partial areas of the thin plate member. The arched area is provided with only partially through-going transverse grooves which provide for a good set off and leave longitudinal ribs which stiffen the shoe in a longitudinal direction. The triangular area which covers a hoof frog effects a blood-pumping relative movement and the collateral cartridge areas of the hoof will be covered by the thin plate material which will not exert any high permanent pressure against these areas. The shoe is shaped smooth so that it can not be braked at the impact.

8 Claims, 1 Drawing Sheet

HORSESHOE, ESPECIALLY FOR TROTTING HORSES

BACKGROUND OF THE INVENTION

The present invention relates to a horseshoe, especially for trotting horses, notably for the hooves on their forelegs. Horseshoes for this purpose should provide the hooves with the necessary wear protection and should, moreover, have as low a weight as possible, and they should also be extensively pleasant in use for the horses. It is to be noted that the shoes previously developed for the purpose have not been appropriate in all these respects, especially not as far as low weight and accounting for the physiology of the hoof are concerned. The hooves on the forelegs of trotting horses are subject to considerably larger impact than when in the natural condition, and it is well known that top-trained trooting horses are only operative during a very few years, as they develop a decreased mobility of the hoof joints during this period of time.

It has been customary to shoe horse hooves with iron shoes, which extend curved along the rim of the hoof, where the natural wear is at its greatest ,and hereby also the central and rear soft parts are taken into account, as these parts are generally elevated from the ground by positioning the shoe along the rim of the hoof. The concerned soft parts are primarily constituted by a central, longitudinal, backwardly projecting pad named the "frog" which is of increasing width towards the rear, and a pair of cartilage areas on both sides of this, named the "collateral cartilage", which is thus situated at the rear half of the hoof between the rearwardly open rim portion of the hoof and the sides of the "frog".

In connection with specially developed shoes for trotting horses it has been natural still to protect both the hoof rim and the pad or "frog", while the collateral cartilage areas have needed no special protection since they will already be situated above the ground when the hoof rim and the frog are covered with a shoe of appreciable thickness. Therefore, such a special shoe extends arched along the front half of the hoof rim, unto which it is fastened by studs, and therefrom inwards to a central area from which a plate shaped area extends rearwards for covering said pad or "frog". The collateral cartilage areas on both sides of the front end of the frog are hereby left uncovered in an immediately seemingly acceptable manner, whereby the iron shoe need not extend over these areas, which entails a desiredly reduced weight of the shoe.

The said rearwardly projecting plate area which covers the frog cannot be fastened to the hoof, as only the front half of the hoof may be made use of without risk for receiving studs, and therefore a sturdy, transverse middle portion is used to stabilize the backwardly projecting portion. The contour of such a shoe is like a mushroom, through with a central hole in the foremost, almost semi-circular part.

In a known, appropriate method of mounting such shoes a slightly resilient intermediate layer is interposed between the shoe and the hoof, e.g. a leather plate, which is embodied fully covering the entire underside of the hoof. Hereby the collateral cartilage areas are covered, such that they are protected in a gentle manner against tearing from particles on the trotting track, and it is furthermore obtained that the frog area is supported on a softer surface that the hard iron surface of the rearwardly projecting part of the shoe.

A shoe is also known which is adapted to the purpose in shape of a quite thick plate of resilient plastic being shaped nearly in full relative the underside of the hoof, with the plate being embodied with lateral, strongly downwardly projecting ribs for achieving a good set-off against the ground. These shoes are provided with a relatively small central opening, which reduces the weight of the shoe slightly, while they end at the rear along a straight transverse line situated in front of the rear end of the frog of the hoof. In spite of their being used extensively, shoes of such a design may be called a temporary curiosity, inasfar as they do give the hoof an excellent groud grip, but far from make account for the healthiness and the natural conditions of functioning of the hoof. The shoeplate is resiliently bendable to a certain extent, but only about transverse portions, as the ribs stiffen the plate in the lateral direction, and the very poor downwards bendability of the back end of the shoe plate is of limited positive value. However, it is a pronounced disadvantage that the collateral cartilage areas are covered by the plate, this having a quite hard surface, as the collateral cartilage is subject to inappropriate action such that a further chondrification occurs inside the hoof, inhibiting the mobility of the hoof and probably causing soreness of the hoof. Another immediate disadvantage is that the rear edge of the central hole thereof extends across the frog, whereby this bulges down both in front and towards the rear, which inevitably causes soreness in the hoof.

Several further suggestions concerning special shoes are known, but generally the various shoes have well shown one or more of the advantages which an ideal shoe should have, but not at all all of them. In certain cases shoes have been developed intentionally for improving th performance of a healthy horse, but which, when used even for a short time, are disabling for the horse or at least entail such inconveniences and soreness that over time the good results become pronouncedly less good for one and the same horse. A crude example is the abovementioned thick plastic shoes, but even where the shoes are designed based on a better understanding of the functioning and healthiness of the hoof, substantial inconveniences of a more or less recognized kind occur. Use has thus been made of special shock-absorbing shoes or intermediate shoe layers, but even though such a function may be advantageous for the healthiness of the hoof, the shoe is not advantageous in the proper sense of the word if it presents other inconveniences such as a firm pressing against the collateral cartilage area or a neutralizing of the natural function of the frog. Additionally, the shoe is not appropriate even though it is physiologically well-suited for the well-being of the horse but at the expense of the performances of the horse by the physical contact between the shoe and the trotting track, and therefore an ideal shoe should have to take account of both of these aspects, which is the aim of the present invention.

US-A-3,513,915 discloses a shoe which is suitable for general use. The shoe is a plastic plate of resiliently bendable material provided with a hole in the middle for ventilating the frog, but having a thickened outer edge portion corresponding to the shape of a conventional horseshoe. This shoe is not especially suitable for trotting horses, inasfar as it is not provided with special set-off imroving means, and, moreover, it is tapering reawardly due to the conventional shape of the thickening, such that a forward sliding on the track will be braked. In connection with the invention it is reaized that it is essential for the running speed to make an unhindered forward sliding possible while it is in contact with the track by the set-down of the hoof. Furthermore, the far backwardly projecting thickening constitutes an unhealthy permanent covering of the collateral cartilage areas, and the frog will primarily be elevated from ground level, to which it is not naturally destined. As mentioned the frog is a pad which has an essential function as a blood pump, and not least for a trotting horse it will be essential that this pump functions according to its purpose.

By using full plate shoes it may have been obtained to protect the frog, but generally its function as a blood pump has not been taken into account. It is known that it is appropriate to fill out the space between the lower side of the frog and the upper side of the plate if the hoof projects down so far that the frog is elevated from ground level, such that a stimulating contact is established. This may be done by using a casting mass or by interposing a piece of leather for constituting a frog pressure pad. It is correspondingly known to provide for a frog pressure pad as an integrated part of the shoe, cf. US-A-4,513,825, which, besides, only concerns an intermediate layer for use in connection with a metal shoe; a certain shock absorption and pressure distribution is aimed at, but otherwise this particular plate member is not particularly advantageous, because it will exert a firm pressure on the collateral cartilage areas, and not substantially increase the blood pumping effect of the frog.

It is the aim of the present invention to provide a shoe of the full-plate type, which can be used as a technically highly efficient trotting shoe, while also taking the well-being of the horse into account to a previously unknown extent, whereby the combination of these qualities makes the shoe an entirely appropriate shoe.

The invention is based on the consideration that the frog is not just a pad, but actually a strongly required blood pump, the mission of which is to further the blood circulation in the tissue of the hoof for safeguarding a good flexibility in the hoof which is situated in an outer area of the blood circulation system of the animal. The frog should therefore preferably be activated regularly when the hoof is set to the ground, which happens naturally when the horse moves around in its natural condition. It will still be desirable to skid protect the frog as far as trotting horses are concerned, as especially their front hooves are generally subject to greater wearing action than in the horse's natural condition, where extremely fast trot is no natural pace, but specifically during trotting the hoof is subject to very great action, whereby it will be advantageous for several reasons if the frog is able to be extra active as a blood pump.

In accordance with advantageous features of the horseshoe of the present invention, the shoe is constituted by a thin plate element which covers the entire hoof surface and is provided with two mutually separated thickened areas, namely, a first arched area extending along the outer rim portion of the front of the element and being provided with transverse grooves which extend over only a part of the thickened rim area so as to leave an unbroken rib portion extending along the sides of the element, as well as a number of transverse rib portions. A second primarily triangular area extends backwards with an increasing width from a front end area which is situated in front of the transverse middle line of the shoe, such that the triangular area is connected with the rear end of the first area through a connection area including a thin plate material.

BRIEF DESCRIPTION OF THE DRAWINGS

FIG. 1 is a perspective view of a horseshoe according to the invention, while

DETAILED DESCRIPTION

Figure 1:
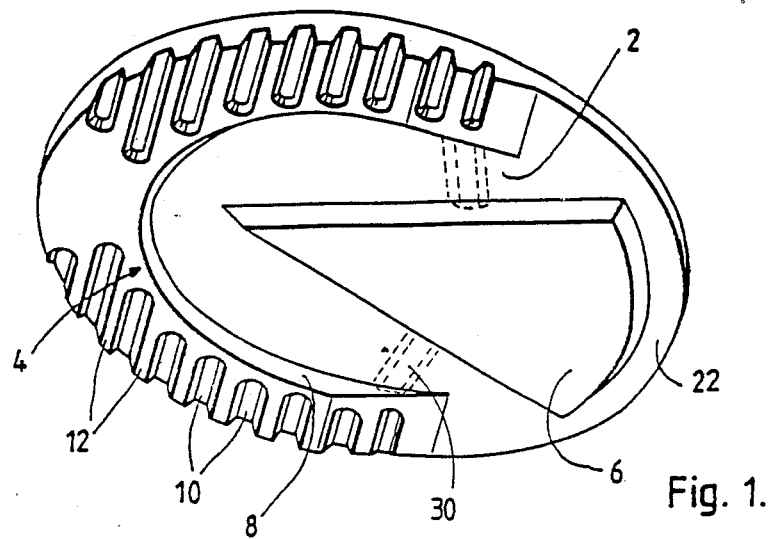

The shoe shown is constituted by a solid-cast body of polyurethane or a corresponding wear-resistent, resiliently bendable material, and the shoe includes an upper plate portion 2 having a thickness of 3–5 mm, and being provided with two downwardly thickened areas, namely, an arch-shaped area 4 and a triangular area 6. The arched area 4 extends along the rim of the front half of the shoe, the inner edge thereof being an inclined edge surface 8. The area is provided with a number of transverse grooves 10, which are confined between oblique wall parts on intermediate transverse ribs 12, and which extend from the outside inwards to a continuous, arched rib portion 14 which constitutes the interior rim of an arched area 4. Towards the rear, for example, at or immediately behind the middle transverse area of the shoe, the arch area 10 is obliquely ended along an extension 16. The bottom of the grooves 10 is about flush with the outer side of the thin plate member 2.

The grooves 10 are moreover sufficiently wide and deep for receiving the conically shaped head portion of a normal stud.

The thickened triangular area 6 extends from a central area 18 of the shoe plate somewhat in front of the middle transverse line of this and backwards with increasing width to an arched rear area 20 which is situated slightly in front of the rear edge portion 22 of the shoe plate. The side edge surfaces of the area 6 are pronouncedly inclined upwards and outwards, e.g. at an angle of appx. 45°.

The shoe is so dimensioned, though in a few different sizes, that by fitting a normal hoof in width, or even being slightly wider than this it will extend entirely to the rear end of the hoof, even preferably slightly backwardly projecting from this. The shoe may be rasped at the sides for a good fitting, as it is essential that the shoe not be laterally protruding, since this may cause hock damage on the hind legs of the horse when the forelegs and the hind legs cross during fast trotting, which is well known when using iron shoes. Also the rear area 22 may easily be shortened if it protrudes too far backwards. The triangular area 6 which covers the hoof frog 24 indicated in dotted lines in FIG. 2 has a stiffening effect on the rear portion of the shoe plate, while the arch rib 14 stiffens the front part, and as the two areas 6 and 14 overlap each other seen in the longitudinal direction of the shoe, the shoe as a whole will be reasonably stiff despite the light resiliency of the thin plate material 2, which connects the concerned two areas mutually. In practice the shoe will hereby be reasonably stable as far as its shape is concerned, such that it is easy to handle by the mounting, which may be effected e.g. by using 3–4 studs at each side, and such that the rear portion of the shoe is held against the hoof and the frog 24 only through the front half of the shoe being fixed to the hoof.

However, this does not obstruct the triangular area 6 from effecting both longitudinally and laterally tipping movements as well as up-and-down-going movements with resilient bending of the surrounding thin plate material 2. To the rear the triangular area 6 is preferably provided with some longitudinal grooves which are open towards the rear as indicated in dotted lines by 28 in FIG. 2.

Figure 2:
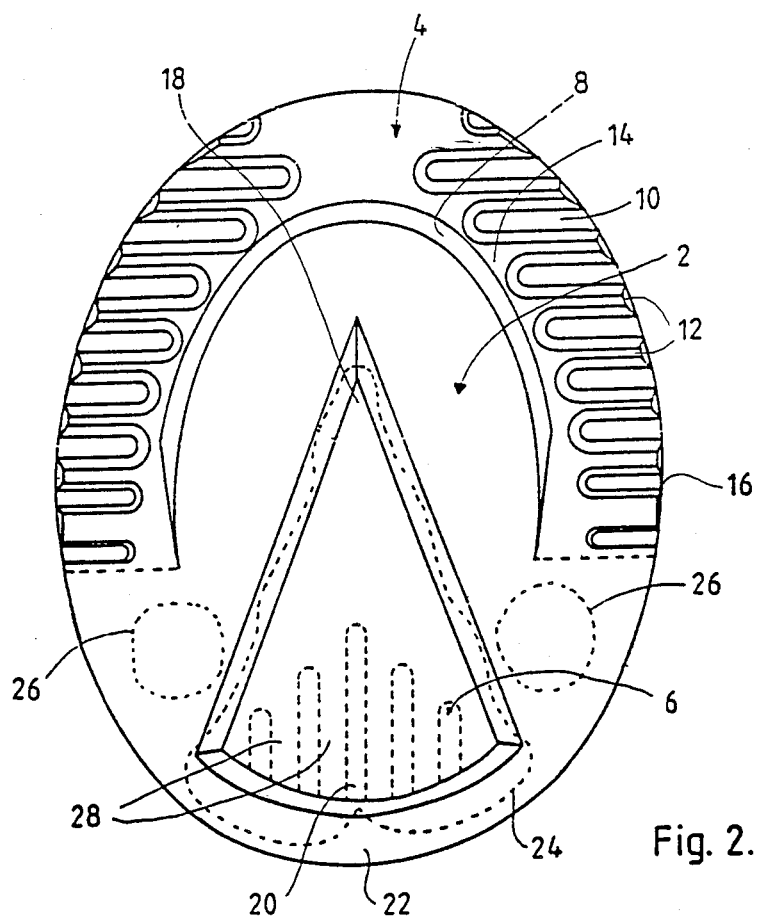
FIG. 2 is a plan view of the underside of the shoe.

The collateral cartilage areas are indicated in dotted lines by 26 in FIG. 2. It will be appreciated that these areas are covered only by the thin plate material 2.

The upper side of the shoe plate which is placed against the underside of the hoof may be completely plane and smooth, but it will, however, be a possibility that it may have an upper frog pressure pad elevation in a known manner. Optionally, facing the collateral cartilage areas 26 it might inversely be shaped vaulting slightly downwards, such that the pressure against these areas is further reduced.

It should be noted that the line-shaped transition areas between the thin plate portion 2 and the oblique walls which lead down to the thickened areas 4 and 6 are preferably provided as cross-sectionally rounded transitions, such that the occurring mutual movements between the areas 4 and 6 do not cause any considerable weakening of the material by a notch effect in tha transition areas.

The shoe of the present invention presents a number of substantial advantages, namely, the shoe may be provided as a pronounced light weight shoe which should not be completed by a metal shoe. Moreover, the hoof frog is effectively protected in its entire length, and it is allowed to work as a powerful blood pump because the covering triangular area of the shoe plate extends down to touch the track and is able to effect substantial up-and-down-going movements as well as tipping movements by the contact with the track. As it is the rear end of the hoof which is set to the ground first by the impact of the hoof it will immediately be the rear, wide area of the frog which is pressed upwards in a gentle and effectively blood-pumping manner. The hereby strongly increased blood circulation diminishes the chondrification tendencies which otherwise occur when the soft parts of the hoof are subject to violet mechanical influence.

Additionally, the shoe plate of the present invention does cover the collateral cartilage areas 26, but only by yieldable thin plate portions which will not exert any permanent hard pressure on these areas. Of course the collateral cartilage is subjected to a certain jolting influence by the impact of the hoof, but, firstly, the brief jolts are not decisive and, secondly, they are weakened as a consequence of the covering thin plate material not reaching the track surface for example, the influence will be transmitting through and weakened by the resilient thin plate material. It is of essential importance to the healthinenss of the hoof that the collateral cartilage is thus both protected against strong wearing action and still kept covered without any great permanent pressing action.

Furthermore, as mentioned above, the impact of the hoof occurs first at the rear end of the hoof. As the horse is moving a forward sliding tendency will occur already in connection with the impact, and of course it will be very wrong to brake this forward sliding by using rear transverse ribs as already known, or at all using rear, downwardly projecting heel portions on the shoe, and almost all prior shoes display such heel portions. In the shoe according to the invention the rear end of the triangular area is smooth or even provided with the said longitudinal grooves 28, whereby no substantial braking occurs by the impact, but on the contrary—by means of the grooves 28—a decreased impact contact surface and a direct guiding of the forward sliding in its direction of movement. Per impact this will entail a speed increase of fractions of a second, but the result will be several, often precious seconds.

It is equally decisive that the shoe of the present invention does not in another manner cause a braking of the impact of the rear end of the hoof, and here it is essential that the side edges of the triangular area 6 stretch backwards in such a manner that friction-causing particles in the track surface may yield outwards and backwards through the space between the respective side edges and the rear edges of the outer, arched portion 4 without causing any substantial braking effect. Also the vertically inclined shape of the side edges of this triangular area contributes hereto.

For the subsequent set-off contact with the track it is essential that the shoe be provided with the transverse grooves 10 at the front end of the shoe, as the set-off takes place herefrom, but it will be appreciated that the shoe is provided with transverse grooves only at its front end, and that these grooves are not entirely through-going, the remaining rib 14 being essential for a desired rigidity of the shoe in its longitudinal direction.

The partially sliding and thus not abruptly braking impact of the rear end of the hoof entails a further, very essential advantage, namely, that the hoof is set down gradually and not joltingly on the racing track. By the usual abrupt braking of the forward sliding of the rear end of the hoof it occurs that the hoof of the moving horse is turned downwards joltingly about the rear engagement area, which causes a powerful impact of the front edge area of the hoof/shoe against the racing track, and this jolting impact is transmitted to the upper parts of the hoof, including the sensitive fetlock joint portion further upwards, such that this is subjected to considerably greater influence than it is built for. There is reason to believe that by using the known shoes this contributes strongly to causing substantial soreness in the area, concurrently with the the collateral cartilage being maltreated, whereby additionally, due to the insufficient blood circulation, an advanced chondrification of the soft parts easily occurs, such that the hoof becomes less flexible. During trotting the hoof moves so fast that it is hardly possible to study the detailed sequence of the movements, but it is a characteristic for known shoes that they are strongly worn at the very foremost area of the shoe, while it has been found that a shoe according to the invention is worn evenly over the entire lower tread surface, and even with noticable longitudinal stripe formations as a sign of the shoe effecting a sliding when in contact with the track. Therefore, it is reasonable to suppose that at the impact of the hoof no very strong impact turning of the hoof as said, but a more natural and soft downwards turning occurs, which might last a fraction of a second longer but protects the hoof without sacrificing speed, which is furthered by the said sliding.

The bottom of the grooves 10 is about flush with the surface of the thin plate portion 2, for example, the used studs are only to penetrate a relatively thin plate, while their conically thickened head portions fit into the cross section of the grooves. This implies that the pressure that the shoe exerts against the underside of the hoof in the area just around each stud will be of a moderate magnitude, whereas otherwise—when the stud is driven through a thick plate member—this pressure may be very large because of the friction of the stud against the pierced material. There is no doubt that many horses have become sore in the hoof because of this pressure, and so-called corns have been observed in the concerned areas, whereas they have not been observed by use of the shoe according to the invention.

It should be noted that in order to facilitate the handling of the shoe by the shoeing and the adaptation of the hoof it may be desirable that the rearend of the shoe is stiffened a bit relative the front end, which can be provided for by a slightly thickened, transverse rib portion 30 provided on the thin plate portion 2 between the side edges of the triangular area 6 and the rear ends of the arched area 4. In view of the fact that the shoe does not cause a braking of the impact of the rear end of the hoof, this rib should not be so thick or steep that it can brake the forward sliding of the shoe substantially.

In connection with the invention it has not been found decisive that a special shock-absorbing material be used, provided only that the material is wear-resistant and suitably resilient for enabling the relative movements of the frog covering area 6 as well as the yielding covering of the collateral cartilage 26. A suitable material is DESMOPAN 359, Bayer, but it is not to be excluded that other materials may be used, possibly with special shock-absorbing qualities. It is entirely undesirable for the frog area 6 to consist of a properly speaking soft material, as the disclosed blood pump effect would be reduced hereby.

It may be a desirable modification that the frog area 6 is shaped with an increased height at its pointed front end such that the surface of the area will incline slightly upwards and backwards. At the impact of the hoof against the track it may hereby be the entire frog area and not just its rear end which is set to the ground, and it may even be obtainable, then, that the elevated central area of the shoe is set to the ground first, such that the pressure will be transmitted backwards therefrom, though in the course of a nearly unmeasurably brief period of time. It is estimated to have no negative implications that the foremost area of the frog will hereby be pressed relatively far upwards into the hoof when the shoe is plane against the ground, and it is to be noticed that hereby no correspondingly upwards pressing of the collateral cartilage 26 will occur.

I claim:

1. A horseshoe, primary for four legs of trotting horses, and consisting of a wear-resistant plate element of resiliently bendable plastic, the underside of which is provided with downwardly projecting portions, characterized in that the horseshoe includes a thin plate element for covering an entire hoof surface and is provided with two mutually separated thickened areas including a first, arched area extending along an outer rim portion of a front half of the thin plate element and being provided with transverse grooves which extend over only a part of the thickened arched area so as to leave an unbroken rib portion extending in parallel to the outer rim portion of the thin plate element, as well as a number of transverse rib portions, and a second, primarily triangular area extending rearwardly with an increasing width from a front end area situated in front of a transverse middle line of the horseshoe, such that the triangular area is connected with a rear end of the first arched area through a connection area of a material of the thin plate element.

2. A horseshoe according to claim 1, in which the thin plate element has a thickness of 2-5 mm and, preferably, consists of one of a polyurethane and a similar plastic material, extends between the rear end of the arched thickened area and the side edges of the triangular area in such a manner that the interadjacent plate areas which cover collateral cartilage areas of the hoof are constituted by resiliently yieldable plate areas.

3. A horseshoe according to claim 1, in which the grooves between the said rib portion are sufficiently deep and wide for receiving a head portion of a usual stud.

4. A horseshoe according to claim 1, in which the thin plate element projects somewhat rearwardly from the rear end of the thickened triangular area.

5. A horseshoe according to claim 1, in which the rear end portion of the triangular area is provided with longitudinal rearwardly open guiding grooves.

6. A horseshoe according to claim 1, in which the side edge surfaces of the triangular area are pronouncedly inclined in an outwards and upwards direction.

7. A horseshoe according to claim 6, in which the rear edge surface of the triangular area is correspondingly pronouncedly inclined.

8. A horseshoe according to claim 6, in which the triangular area is of an increased thickness at its foremost area and therefrom inclines continuously upwards towards the rear end.

* * * * *